(12) United States Patent
Iwata et al.

(10) Patent No.: US 10,308,305 B2
(45) Date of Patent: Jun. 4, 2019

(54) STRUCTURE FOR MOUNTING LUGGAGE BASKET

(71) Applicant: KAWASAKI JUKOGYO KABUSHIKI KAISHA, Hyogo (JP)

(72) Inventors: Shigeyuki Iwata, Kakogawa (JP); Motoki Kaji, Kakogawa (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 157 days.

(21) Appl. No.: 15/365,035

(22) Filed: Nov. 30, 2016

(65) Prior Publication Data

US 2017/0183051 A1 Jun. 29, 2017

(30) Foreign Application Priority Data

Dec. 28, 2015 (JP) ................................. 2015-256633
Oct. 14, 2016 (JP) ................................. 2016-202604

(51) Int. Cl.
*B62J 9/00* (2006.01)
(52) U.S. Cl.
CPC ..................................... *B62J 9/001* (2013.01)
(58) Field of Classification Search
CPC .................................... B62J 7/04; B65D 43/22
USPC ......................................... 224/431, 433, 443
See application file for complete search history.

(56) References Cited

U.S. PATENT DOCUMENTS

| 4,081,117 A * | 3/1978 | Crane ........................ B62J 9/00 224/413 |
| 5,038,983 A * | 8/1991 | Tomososki ............. B60R 9/065 224/521 |
| 5,810,230 A * | 9/1998 | Nutto ......................... B62J 9/00 224/417 |
| 6,053,384 A * | 4/2000 | Bachman .................. B62J 7/04 224/413 |
| 6,293,450 B1 * | 9/2001 | Aron ........................ B62J 9/001 224/413 |
| 6,347,804 B1 * | 2/2002 | Seibel ........................ B62J 1/12 180/219 |
| 6,499,784 B2 * | 12/2002 | Takahashi .............. B62K 11/10 224/413 |
| 6,840,417 B2 * | 1/2005 | Heinrich ................... B62J 9/00 224/413 |

(Continued)

FOREIGN PATENT DOCUMENTS

JP 2013-212742 10/2013

*Primary Examiner* — Peter N Helvey
(74) *Attorney, Agent, or Firm* — Wenderoth, Lind & Ponack, L.L.P.

(57) ABSTRACT

An improved structure for mounting a luggage basket on a vehicle body of a two-wheeled vehicle or the like is provided. Mounting portions for detachably mounting a luggage basket on any mounting place (a desired position on the vehicle body such as a pannier stay) of the vehicle body are formed on the luggage basket. The mounting portions are formed on both left and right sides of the luggage basket mounted on the vehicle body respectively. With such the configuration, one kind of the luggage basket having one same shape can be mounted on either the left side or the right side of the vehicle body. That is, it is unnecessary to prepare luggage baskets having different shapes corresponding to the left and the right sides of the vehicle body and hence, the number of parts can be reduced, and thereby a manufacturing cost can be lowered.

15 Claims, 8 Drawing Sheets

(56) References Cited

U.S. PATENT DOCUMENTS

| | | | | |
|---|---|---|---|---|
| 7,963,379 B2* | 6/2011 | Roth | ................ | B62J 9/00 |
| | | | | 190/100 |
| 8,646,669 B2* | 2/2014 | Mann | ................ | B62J 9/001 |
| | | | | 224/413 |
| 8,752,745 B2* | 6/2014 | Bond | ................ | B62J 9/001 |
| | | | | 206/317 |
| 9,010,598 B2* | 4/2015 | Thompson | ................ | B62J 9/00 |
| | | | | 224/431 |
| 9,650,096 B2* | 5/2017 | Visenzi | ................ | B62J 9/00 |
| 2002/0005421 A1* | 1/2002 | Campbell | ................ | B62J 9/001 |
| | | | | 224/430 |
| 2004/0094319 A1* | 5/2004 | Koessler | ................ | H02G 3/081 |
| | | | | 174/50 |
| 2004/0232183 A1* | 11/2004 | Watanabe | ................ | B62J 9/001 |
| | | | | 224/413 |
| 2005/0150921 A1* | 7/2005 | Schneider | ................ | B62J 9/00 |
| | | | | 224/413 |
| 2006/0163302 A1* | 7/2006 | Knoch | ................ | B62J 9/001 |
| | | | | 224/413 |
| 2013/0257115 A1 | 10/2013 | Kishi et al. | | |
| 2015/0203165 A1* | 7/2015 | Bunyer | ................ | B62J 7/04 |
| | | | | 224/413 |

\* cited by examiner

PANNIER CASE IS MOUNTED ON RIGHT SIDE OF VEHICLE BODY

PANNIER CASE IS MOUNTED ON RIGHT SIDE OF VEHICLE BODY

STRUCTURE FOR MOUNTING LUGGAGE BASKET

BACKGROUND OF THE INVENTION

1. Field of the Invention

The present invention relates to a structure for mounting a luggage basket on a vehicle.

2. Description of the Related Art

As an accessory (optional element) mounted on a two-wheeled vehicle, conventionally, there has been known a luggage basket mounted on both left and right sides of a rear seat respectively and storing luggage therein. Such luggage basket is called a pannier case in general, and is introduced as left and right side trunk in JP 2013-212742 A.

There has been a demand for reduction of a manufacturing cost of such luggage baskets.

SUMMARY OF THE INVENTION

In view of the above, it is an object of the present invention to provide a structure for mounting a luggage basket, which can reduce a manufacturing cost.

According to an aspect of the present invention, there is provided a structure for mounting a luggage basket where a luggage basket is mounted on both left and right sides of a vehicle body respectively. A "mounting portion" for detachably mounting the luggage basket on a vehicle body is provided on the luggage basket. This "mounting portion" is disposed on both left and right sides of the luggage basket in a state where the luggage basket is mounted on the vehicle body.

Since the "mounting portion" is provided on both left and right sides of the luggage basket mounted on the vehicle body, the luggage basket of one kind having the same shape can be mounted on either a left side or a right side of the vehicle body. That is, it is unnecessary to prepare luggage baskets having different shapes corresponding to left and right sides and hence, the number of parts can be reduced, and thereby a manufacturing cost can be lowered.

Further, according to another aspect of the present invention, there is provided a structure for mounting a luggage basket where a luggage basket and a member having a function different from fixing the luggage basket (a tandem grip which a fellow passenger grips, for example) are mounted on a vehicle body using commonly one same mounting place on the vehicle body.

According to the structure for mounting a luggage basket having such a configuration, parts can be commonly used and hence, the number of parts can be reduced whereby a manufacturing cost can be lowered.

DETAILED DESCRIPTION OF THE INVENTION

Figure 1:
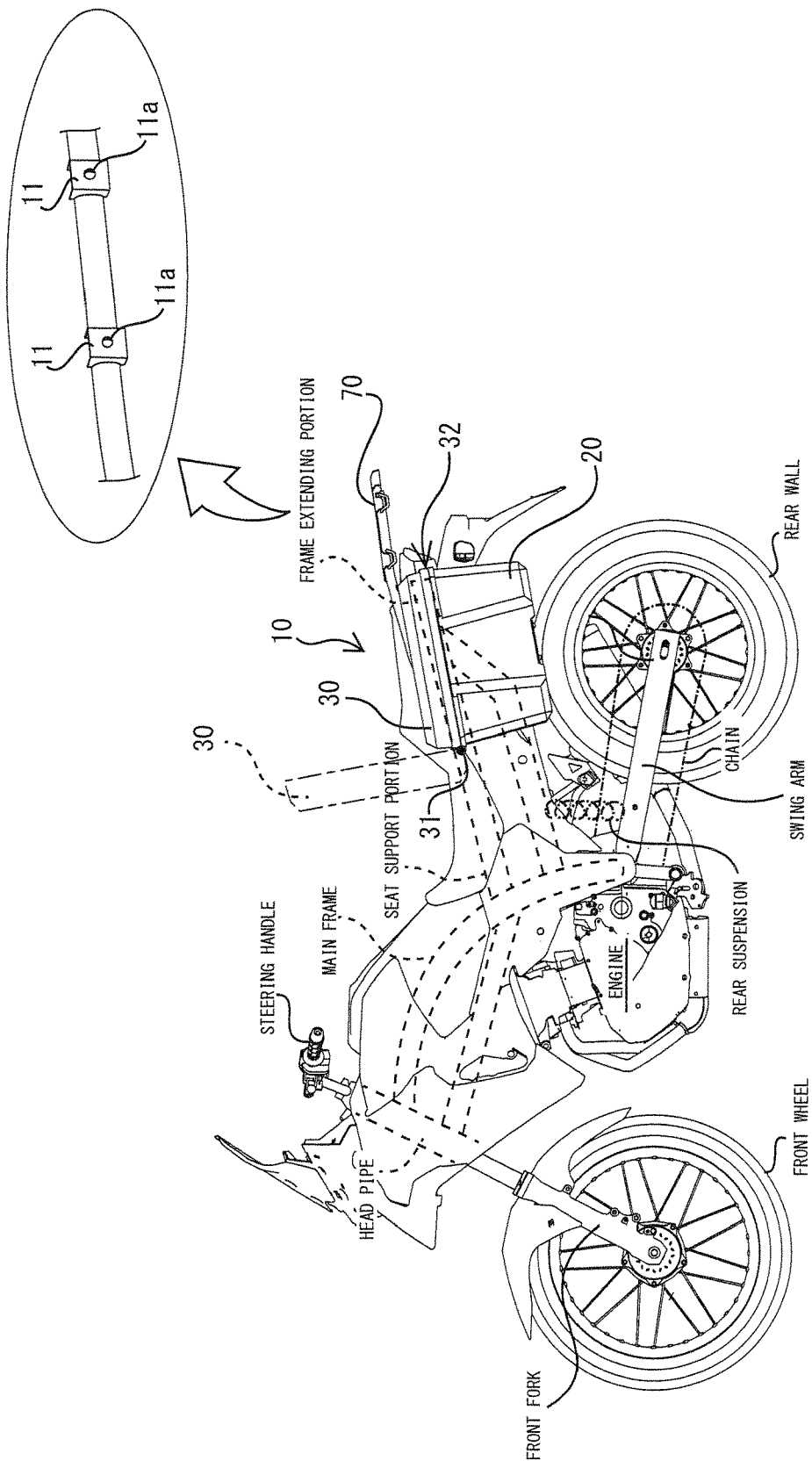
FIG. 1 is a view for describing a motorcycle to which a structure for mounting a luggage basket of one embodiment of the present invention is applied.
Figure 2:
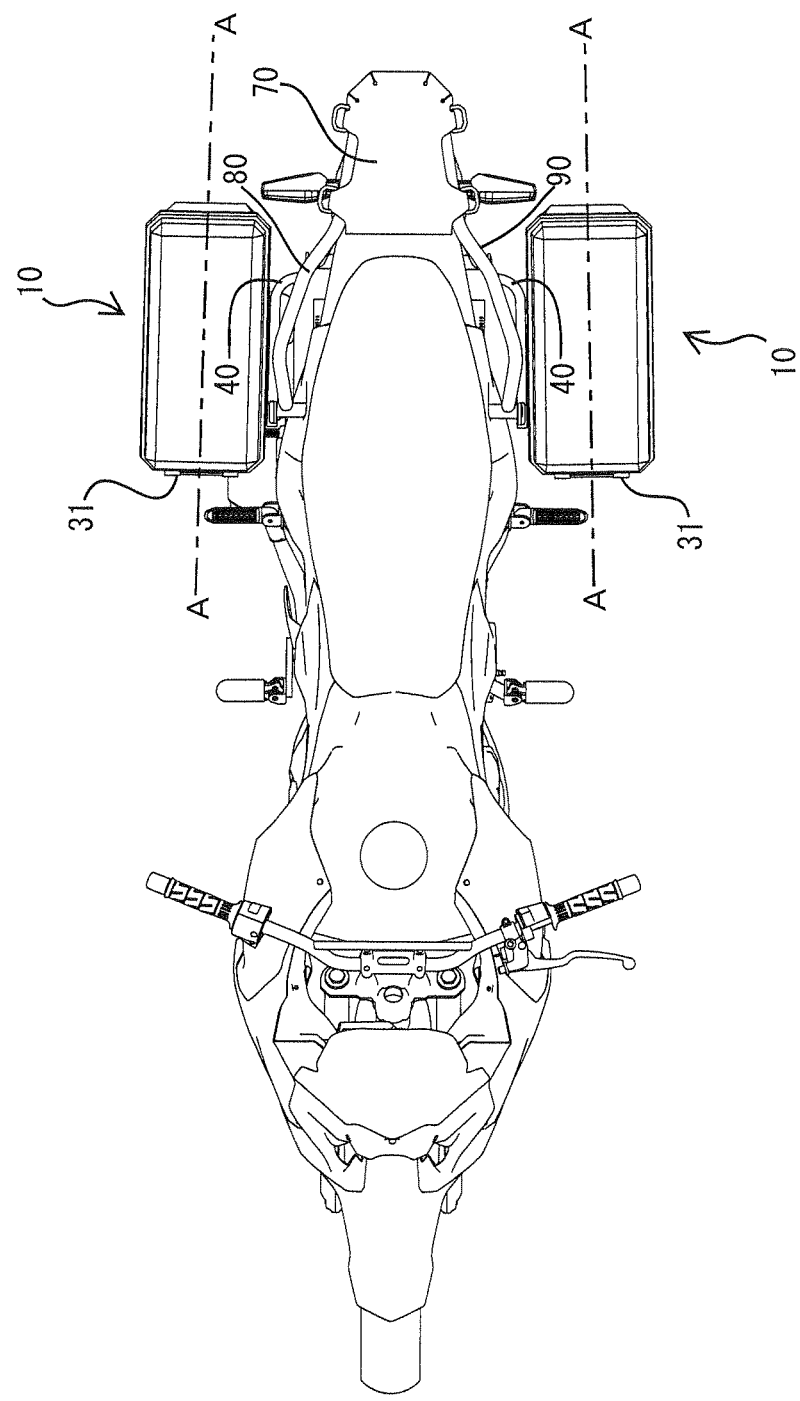
FIG. 2 is a view of the motorcycle shown in FIG. 1 as viewed from above.

Embodiments of the present invention are described hereinafter with reference to attached drawings. FIG. 1 and FIG. 2 schematically show a motorcycle to which a structure for mounting a luggage basket according to one embodiment of the present invention is applied. A pannier case is a luggage basket, that is, a case for storing luggage. Since the pannier case is not an on-vehicle component having a function required for driving a vehicle, the vehicle can travel even when the pannier case is not mounted on the vehicle. For example, the pannier case is formed so as to be detachable from a vehicle body, such that the pannier case is mounted on after the vehicle body is manufactured or is removed from the vehicle body, according to the preference of a rider.

In this embodiment, a pannier case (luggage basket) 10 is detachably mounted on both left and right sides of the vehicle body. An accessory of the pannier case 10 is to be mounted on or is removed from the vehicle body depending on a situation.

In this embodiment, the structure for mounting a luggage basket of the present invention is applied to a motorcycle. As shown in FIG. 1, a frame which forms a skeleton of the vehicle body of the motorcycle is formed of: a main frame portion which supports a fuel tank (not shown in the drawing) and an engine; a seat support portion which extends rearward from the main frame portion and supports a rider seat; and a frame extending portion which extends rearward from the seat support portion and supports a passenger seat and the like.

A head pipe is disposed on a front portion of the main frame portion, and holds a steering handle in a rotatable manner. A front fork which moves correspondingly with a steering angle of the steering handle supports a front wheel from both sides. A front suspension (not shown in the drawing) formed of a spring or the like is housed in the front fork and absorbs an impact which the front wheel receives from a road surface.

A swing arm is disposed on a rear portion of the main frame portion, and a rear wheel is held on distal ends of the swing arm. Rear suspensions, which are disposed so as to connect the swing arm and the frame extending portion, absorb an impact which the rear wheel receives from a road surface.

An output from the engine which is a drive source held by the main frame portion is transmitted to the rear wheel through a transmission (not shown in the drawing) and a chain, such that a driving force is transmitted to a ground surface whereby the vehicle body advances. The motorcycle is a saddle-ride-type vehicle where a rider straddles over the vehicle body and wraps his legs around the vehicle body. The structure for mounting a luggage basket of the present invention is preferably applicable to such the vehicle.

The frame extending portion further extends rearward from a portion thereof on which the passenger seat is supported, and supports a load supporting plate member 70. In this embodiment, the frame structure is covered by a cowl, which is an outer shell of ornamental member.

Front end of the pannier case 10 is positioned behind a front end of the rider seat. Upper surface of the pannier case is disposed at a position substantially equal to or slightly lower than a passenger seat surface and hence, it is possible to prevent the interference between the pannier case 10 and a passenger even when the passenger sits on a passenger seat.

Figure 3A:
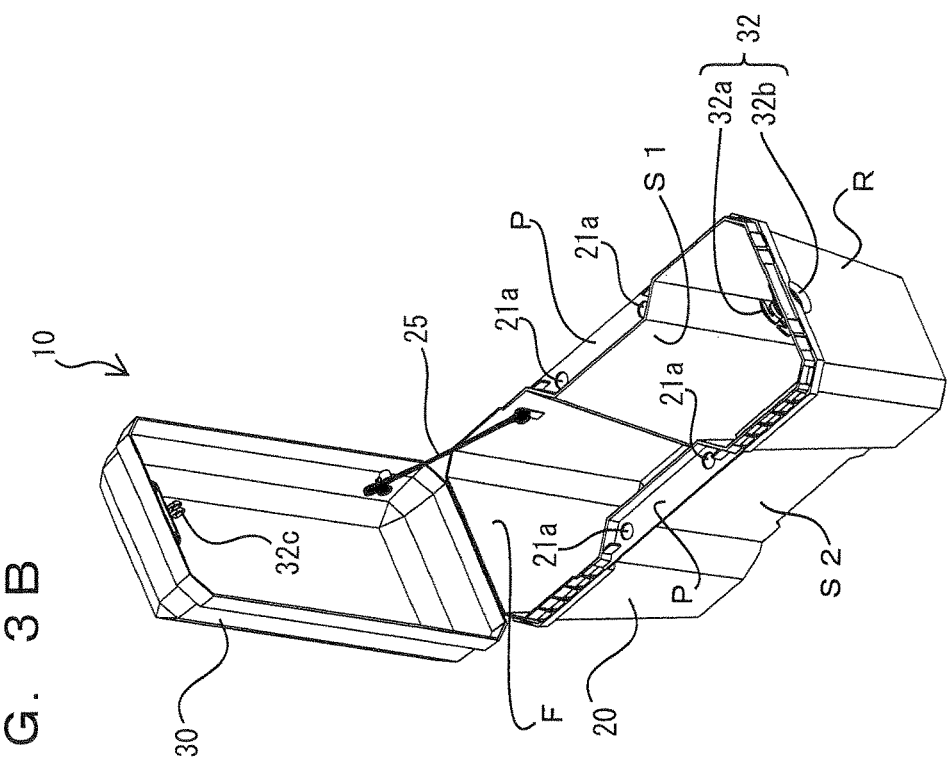
FIG. 3A and FIG. 3B are views for describing a pannier case (luggage basket) used in FIG. 1 and FIG. 2.
Figure 3B:
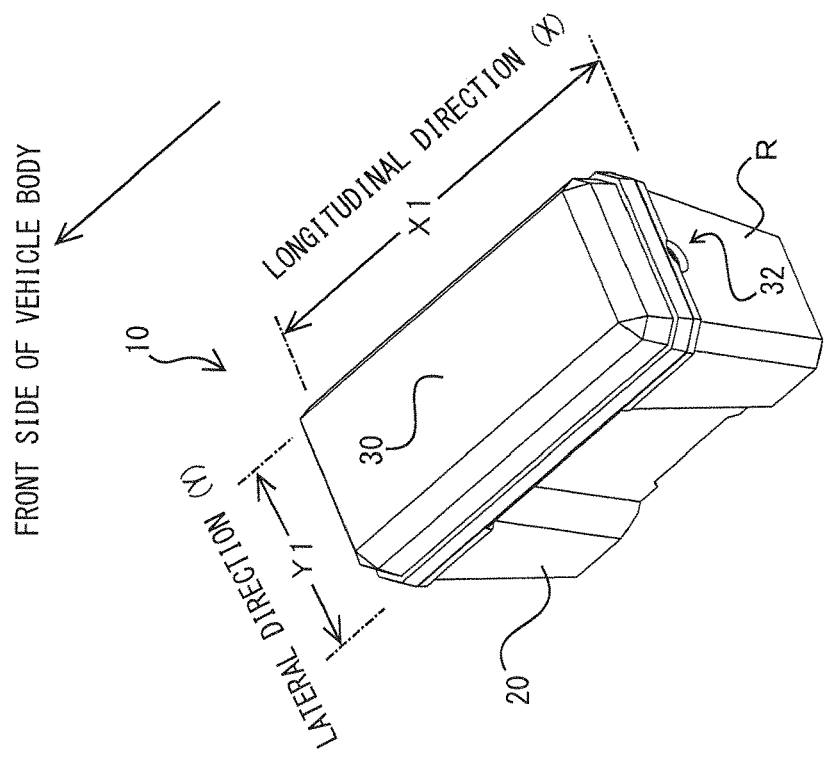

FIG. 3A and FIG. 3B show only pannier case 10 shown in FIG. 2, wherein FIG. 3A shows the pannier case 10 in a state where an open/close lid 30 of the pannier case 10 is closed, and FIG. 3B shows the pannier case 10 in a state where the open/close lid 30 is opened.

As shown in FIG. 3A, the pannier case 10 is formed such that, in a state where the pannier case 10 is mounted on the vehicle body, a longitudinal size X1 which is a size in a longitudinal direction X of the vehicle body is set larger than a lateral size Y1 which is a size in a lateral direction Y of the vehicle body. That is, the pannier case 10 is, as viewed from right above, formed into a rectangular shape having long sides extending along the longitudinal direction X and short sides extending along the lateral direction Y.

Hereinafter, a longitudinal direction of the pannier case when the pannier case is mounted on the vehicle body is simply referred to as "longitudinal direction". A lateral direction of the pannier case when the pannier case is mounted on the vehicle body is simply referred to as "lateral direction".

The pannier case 10 includes: a luggage basket body 20 in which a storing space for storing luggage is formed; an open/close lid 30 which covers the luggage basket body 20 from above; and a locking portion 32 which locks the luggage basket body by the open/close lid. The luggage basket body 20 includes: a bottom wall L (see FIG. 4A); and peripheral walls (F, R, S1, S2) extending upward from edge portions of the bottom wall L. An opening which opens upward is formed in the luggage basket body 20. In this embodiment, the bottom wall L is formed into a rectangular plate shape, and the peripheral walls are formed into a rectangular cylindrical shape. That is, the peripheral walls are formed of a front wall F directing frontward, a rear wall R directing rearward, and a pair of left and right side walls S1, S2. With such a configuration, the luggage basket body 20 has a rectangular parallelepiped storing space.

The open/close lid 30 is formed larger in size than an upper edge portion of the luggage basket body 20. With such a configuration, in a state where the open/close lid 30 is closed, the upper edge portion of the luggage basket body 20 is concealed when viewed in a top plan view (see FIG. 2). In a state where the open/close lid 30 is closed, a lower edge of the open/close lid 30 is positioned below upper edge of the peripheral walls of the luggage basket body 20. As a result, a portion is formed where the open/close lid 30 and the peripheral walls (F, R, S1, S2) of the luggage basket body 20 are made to overlap with each other in vertical direction. With such a configuration, it is possible to prevent the formation of a gap which makes the storing space and an outer space communicate with each other between the open/close lid 30 and the peripheral walls of the luggage basket body 20. That is, the peripheral walls (F, R, S1, S2) engage with an inner peripheral side of the open/close lid 30, when the open/close lid 30 is closed, to prevent the intrusion of rain water. Further, the peripheral walls (F, R, S1, S2) also have a function of preventing picking (theft).

As shown in FIG. 3B and other drawings, the pannier case 10 includes a string member 25. The string member 25 is made of a deformable material. One end of the string member 25 is fixed to an inner wall of the luggage basket body 20 and the other end of the string member 25 is fixed to an inner wall of the open/close lid 30. The string member 25 has a function of preventing the excessive opening of the open/close lid 30. To be more specific, the string member 25 prevents the luggage basket body 20 and the open/close lid 30 from being spaced apart from each other by a predetermined distance or more.

Figure 4B:
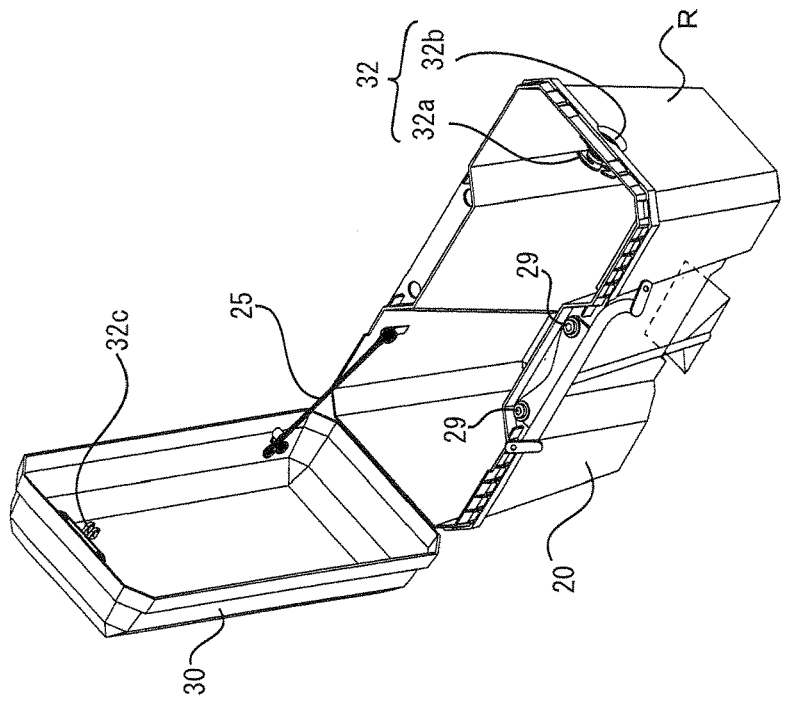
FIG. 4A and FIG. 4B are views for describing a state where a mounting bracket is connected to the pannier case shown in FIG. 3.
Figure 4A:
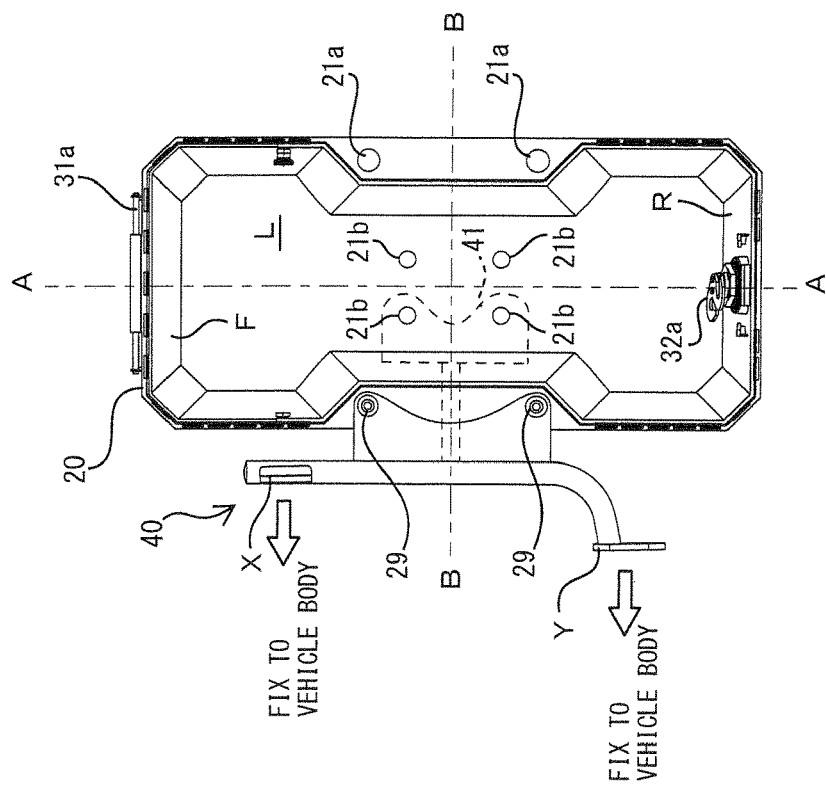

As shown in FIG. 4A, the outer shape of the pannier case 10 is symmetrical with respect to an imaginary longitudinal center plane "A", which extends in the longitudinal direction of the vehicle body and passes the center in the lateral direction of the pannier case. As a result, the following advantageous effects can be acquired.

Considered is a case where two of the pannier cases 10 are simultaneously mounted on both left and right sides of a two-wheeled vehicle. Since each pannier case 10 has a symmetrical profile with respect to the imaginary longitudinal center plane "A", an impression of the pannier case as viewed from one side of the vehicle body in the lateral direction and an impression of the pannier case as viewed from the other side of the vehicle body in the lateral direction become the same, such that the external appearance of the vehicle body including the pannier cases becomes unified and the aesthetic appearance can be enhanced.

As shown in FIG. 4A, the outer shape of the pannier case 10 is asymmetrical with respect to an imaginary lateral center plane "B", which extends in the lateral direction of the vehicle body and passes the center in the longitudinal direction of the pannier case. That is, since a portion of the locking portion 32 is exposed from the rear wall R and a rotary connecting portion 31 is formed on the peripheral wall, external appearance of the pannier case 10 is made asymmetrical with respect to the imaginary lateral center plane "B".

Considered is a case where two of the pannier cases 10 are simultaneously mounted on both left and right sides of the two-wheeled vehicle. Supposing a case where the left and right pannier cases are mounted on the vehicle body in directions opposite to each other in the longitudinal direction, although the left and right pannier cases should have been mounted on the vehicle body in the same direction (posture). In such a case, if the pannier cases 10 are asymmetrical with respect to the imaginary lateral center plane "B", a fact where the directions of two pannier cases mounted on the vehicle body differ from each other can be easily recognized visually, compared to a case where each pannier case 10 is formed symmetrical with respect to the imaginary lateral center plane "B".

That is, by forming each pannier case 10 asymmetrical with respect to the imaginary lateral center plane "B", it is possible to allow a rider to intuitively recognize that the pannier cases 10 are assembled to the vehicle body with the pannier cases 10 directed in a predetermined correct direction (posture) in the longitudinal direction of a two-wheeled vehicle. That is, such a structure has an excellent advantageous effect of preventing erroneous assembling (assembling of the pannier case in a wrong direction).

The open/close lid 30 is switchable between an open state where the opening of the luggage basket body 20 is opened and a closed state where the opening of the luggage basket body 20 is closed. The open/close lid 30 is connected to the luggage basket body 20 by way of the rotary connecting portion 31 (see FIG. 1), and the open/closed states of the open/close lid 30 are switched by the displacement of the open/close lid 30 relative to the luggage basket body 20. It is sufficient that the rotary connecting portion 31 be mounted on any portion of the rectangular cylindrical peripheral wall of the luggage basket body 20. In this embodiment, the rotary connecting portion 31 is provided on the front wall "F".

As shown in FIG. 4A, a hinge shaft 31a is immovably fixed near an upper edge of the front wall "F" of the luggage basket body. On the other hand, a sleeve member (not shown in the drawing), which is rotatably supported on the hinge shaft 31a, is formed on the open/close lid 30. The hinge shaft and the sleeve member are connected to each other in a relatively rotatable manner, such that the open/close lid 30 is angularly displaceable relative to the luggage basket body 20 about a hinge axis.

A rotary shaft (the hinge shaft 31a in the embodiment shown in the drawing) around which the open/close lid 30 is rotated extends in the lateral direction of the vehicle body. When the rotary connecting portion 31 is positioned on a front side of the pannier case 10 in the longitudinal direction of the vehicle body, a user can move the open/close lids 30 of the left and right pannier cases 10 upwardly and downwardly from behind the vehicle body without changing a standing position of the user. Thus, it is possible to enhance the operability of the pannier case 10 for the user.

The rotary connecting portion 31 is positioned on the front side of the pannier case 10 in the longitudinal direction of the vehicle body. Considered is a case where a user did not close up the open/close lid 30 tightly or a case where the user forgot to close the open/close lid 30. Even in such the case, the rotary shaft is to be disposed on the front side of the running vehicle. Thus, even when the open/close lid 30 receives a traveling wind pressure during the vehicle running, the open/close lid 30 is scarcely opened inadvertently.

The locking portion 32 includes: a prevention member 32a which prevents the open/close lid from moving in an opening direction from where the open/close lid 30 is closed; and a latch operating portion 32b which performs an open/close operation of the prevention member. When the latch operating portion 32b is operated, the prevention member 32a is switched between a latched state and an unlatched state. The prevention member 32a, when in the latched state, engages with a latch member 32c fixed on the open/close lid 30.

In this embodiment, a latching operation is performed when a key inserted into a key hole is rotated. In this embodiment, the locking portion 32 is disposed on a rear side on the pannier case 10 and hence, entrance of rain water, mud or the like into (the key hole of) the locking portion 32 can be prevented during vehicle running.

The locking portion 32 is disposed on the rear side on the pannier case 10. With such a configuration, a user can easily approach the locking portion 32 formed on the pannier case 10 from behind the vehicle body and hence, an unlocking operation can be easily performed. Further, when two of the pannier cases 10 are mounted on both left and right sides of the vehicle body, compared to a case where the locking portions 32 are positioned on the front side on each pannier case 10 in the longitudinal direction of the vehicle body, a user can easily and continuously operate the locking portions 32 of both pannier cases with little change in his standing position.

As shown in FIG. 3B, a plate portion "P" which projects toward the outside of the storing space is respectively formed on upper portions of both side walls S1, S2 of the luggage basket body 20. The plate portion "P" extends in the longitudinal direction over the entire width of a recessed region on the side walls S1, S2. Two mounting openings 21a are formed in each plate portion "P" in a spaced-apart manner in the longitudinal direction, and the mounting openings 21a penetrate the plate portion "P" in a thickness direction of the plate portion "P".

As shown in FIG. 4A, two mounting openings 21b are respectively formed in the bottom wall "L" on both sides of the imaginary longitudinal center plane "A" (that is: total number of the mounting openings 21b are four). The mounting openings 21b penetrate the bottom wall "L" in a thickness direction of the bottom wall "L".

Upper and lower mounting openings 21a, 21b function as "mounting portions" for detachably mounting the pannier case 10 on a desired mounting place (a fixing nut portions 11 shown in an enlarged manner in FIG. 1, in this embodiment), which is preliminarily provided on a two-wheeled vehicle. In this embodiment, a mounting bracket 40 is fixed to the pannier case 10 by making bolt members 29 pass through the upper and lower "mounting portions (mounting openings 21a, 21b)", and the mounting portions are connected to the vehicle body by way of the mounting bracket 40.

In the region on left side of the imaginary longitudinal center plane "A" in FIG. 4A, two upper "mounting portions (mounting openings 21a)" are formed, and these upper mounting portions are disposed in a spaced-apart manner in the longitudinal direction. One "mounting portion" is disposed on front side of the luggage basket body with respect to a center portion in the longitudinal direction, while the other "mounting portion" is disposed on rear side of the luggage basket body with respect to the center portion in the longitudinal direction. A distance between the center portion in the longitudinal direction and one "mounting portion" is set equal to a distance between the center portion in the longitudinal direction and the other "mounting portion".

In the region on left side of the imaginary longitudinal center plane "A" in FIG. 4A, two lower "mounting portions (mounting openings 21b)" are formed, and these lower mounting portions are disposed in a spaced-apart manner in the longitudinal direction. One "mounting portion" is disposed on front side of the luggage basket body with respect to the center portion in the longitudinal direction, while the other "mounting portion" is disposed on rear side of the luggage basket body with respect to the center portion in the longitudinal direction. A distance between the center portion in the longitudinal direction and one "mounting portion" is set equal to a distance between the center portion in the longitudinal direction and the other "mounting portion".

Also in the region on right side of the imaginary longitudinal center plane "A" in FIG. 4A, likewise as above, two upper "mounting portions (mounting openings 21a)" and two lower "mounting portions (mounting openings 21b)" are formed. The above-mentioned "mounting portions" are formed on both left and right sides of the pannier case 10 respectively. Thus, a luggage basket of one kind having the same shape can be mounted on either the left side or the right side of the vehicle body. That is, it is unnecessary to prepare pannier cases having different shapes corresponding to the left or the right sides respectively and hence, the number of parts can be reduced whereby a manufacturing cost can be reduced.

To be more specific, the number of parts for forming the left and the right luggage basket bodies 20 is reduced, it is sufficient to prepare one set of dies for manufacturing the luggage basket body 20, and thanks to these factors manufacturing cost can be reduced. Further, it is sufficient to prepare one set of dies and hence, there is no possibility of the occurrence of inconvenience that the left and the right luggage basket bodies 20 are not uniform, due to the difference in quality between dies for forming the left or the right luggage basket bodies 20.

When the open/close lid 30 is closed, upper surface regions of the upper and the lower mounting openings 21a, 21b (mounting portions) are concealed in the inside of the pannier case 10, such that the upper and the lower mounting openings 21a, 21b cannot be accessed from the outside of the pannier case 10. Only when the open/close lid 30 is opened, the mounting openings 21a, 21b can be accessed from above.

In this embodiment, the pannier case 10 is mounted on the vehicle body (by way of the mounting bracket 40) using bolt members 29 which are made to pass through the mounting openings 21a, 21b. In a state where the open/close lid 30 is locked by the locking portion 32, heads of the bolt members 29 (that is, operating portions which are operated in cooperation with the mounting portions for removing the luggage basket) cannot be accessed from the outside of the pannier case 10. With such a configuration, it is possible to prevent the undesired removal of the pannier case 10 from the vehicle body (typically, a theft).

Since the mounting openings 21a, 21b (mounting portions) are formed on both sides of the pannier case 10, the mounting openings formed on one side are not used. However, the exposure of the mounting openings not in use to the outside is prevented, such that an aesthetic appearance of the pannier case 10 can be enhanced and, at the same time, the mounting openings are protected from damage or the like.

Particularly in this embodiment, the upper surface regions of the mounting openings 21a, 21b and the heads of the fixed bolt members are concealed by the open/close lid 30 from above, and thus they cannot be visually recognized from the outside of the pannier case 10. Hence, there is also brought an advantage that an aesthetic appearance of the pannier case 10 is not lowered. Note that naturally lower surface regions of the mounting openings 21a, 21b are scarcely seen from the outside of the pannier case 10.

On a rear surface side of the open/close lid 30, a storing space for the heads of the bolt members 29 (see FIG. 4A) could be provided. With such the space for the bolt heads, the interference between the bolt heads and the open/close lid 30 could be prevented.

Figure 5:
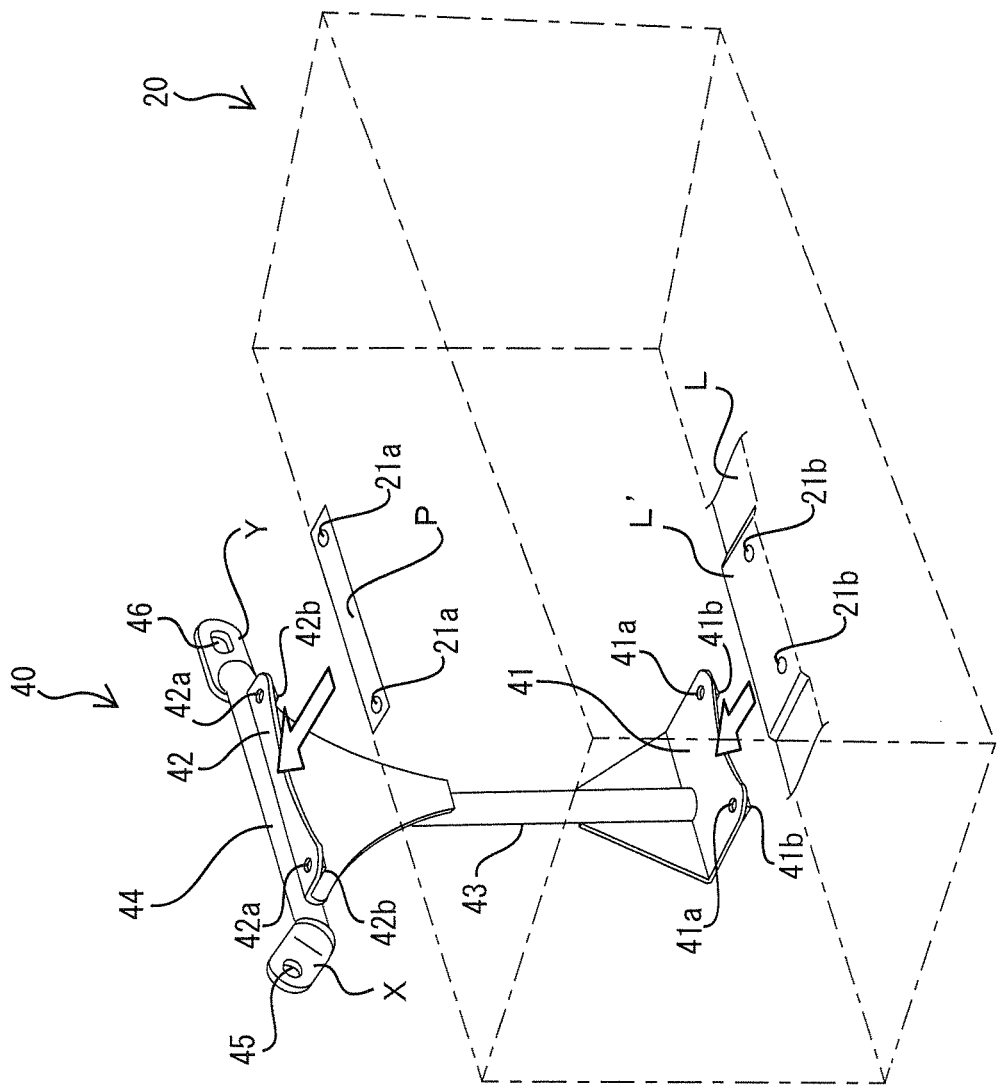
FIG. 5 is a view for describing a way of connecting the mounting bracket to the pannier case shown in FIG. 3.

In this embodiment, the pannier case 10 is mounted on the vehicle body by way of the mounting bracket 40. FIG. 4A shows a state where the mounting bracket 40 is attached on the luggage basket body 20. In FIG. 5, the mounting bracket 40 is drawn by solid lines and a schematic shape of the luggage basket body 20 is drawn by broken lines. The bottom wall "L" and the plate portion "P" of the luggage basket body 20 are partially shown.

The mounting bracket 40 is made of metal material in one-piece. The mounting bracket 40 includes: a lower support portion 41 which supports the bottom wall "L" of the luggage basket body 20 from below; an upper support portion 42 which supports the plate portion "P" disposed on the upper side of the luggage basket body 20 from below; and a joint portion 43 which extends vertically to connect both support portions with each other. Further, a rod-like member 44 is integrally formed with the upper support portion 42 along the horizontal direction, and through holes 45, 46 are respectively formed in plate members "X", "Y" which are integrally formed on both ends of the rod-like member 44.

The lower support portion 41 and the upper support portion 42 are respectively formed into a plate shape which is bent by 90°, and vertical through holes 41a, 42a are formed in regions of the lower support portion 41 and the upper support portion 42 which face to each other.

When the mounting bracket 40 and the pannier case 10 are connected to each other, the plate portion "P" on the luggage basket body 20 side is made to overlap on the upper support portion 42 and, at the same time, the bottom wall "L" is made to overlap on the lower support portion 41. Then, the bolt member 29 is made to pass through the mounting opening 21a and the through hole 42a. A nut portion 42b is integrally formed on lower side of each through hole 42a, and the bolt member 29 is threadedly fastened to the nut portion 42b. Thus, the upper support portion 42 of the mounting bracket 40 is fixed to the mounting openings 21a, which is upper side "mounting portions".

In the same manner, the bolt member 29 is made to pass through the mounting opening 21b and the through hole 41a. A nut portion 41b is integrally formed on lower side of each through hole 41a, and the bolt member 29 is threadedly fastened to the nut portion 41b. Thus, the lower support portion 41 of the mounting bracket 40 is fixed to the mounting openings 21b, which is lower side "mounting portions".

As shown in FIG. 5, a region "L" on the bottom wall "L" which is to be connected to the lower support portion 41 of the mounting bracket 40 is raised upward from the around. Thus, even when the mounting bracket 40 and the pannier case 10 are removed from the vehicle body with being connected to each other, a projection amount of the lower support portion 41 downwardly from the bottom surface of the pannier case 10 can be reduced. Accordingly, the pannier case 10 can be placed on a ground surface in a stable manner.

In this embodiment, the inserted bolt members 29 are rotated about vertical axis to be fastened to the nut portions 41b, 42b, such that the plate portion "P" is clamped and fixed by the heads of the bolt members and the upper support portion 42. Further, the plate portion "P" can be removed by loosening the fastening between the bolt members 29 and the upper support portion 42. Likewise, the bottom wall "L" can be clamped and fixed by the heads of the bolt members and the lower support portion 41, and the bottom wall "L" can be removed by loosening the fastening between the bolt members and the lower support portion 41.

Although not shown in the drawing, it is preferable that the bolt members 29 connect the luggage basket body 20 and the mounting bracket 40 to each other with an elastic member interposed therebetween. By this, some advantageous effects are brought, that is, vibrations from road surface and the engine are reduced, and the generation of cracks due to vibrations or excessive fastening can be prevented.

As can be clearly understood from FIG. 4A and FIG. 4B, the peripheral walls of the luggage basket body 20 are formed, in such a way that a distance between the peripheral walls in the lateral direction at the center portion in the longitudinal direction is smaller than that at both end portions in the longitudinal direction. That is, the center portions of the peripheral walls in the longitudinal direction are made indented toward the inside, and the indented portion functions as spaces where the rod-like joint portion 43 of the mounting bracket 40 is disposed (see FIG. 4B). With the formation of such the indented portions, the whole pannier case 10 can be positioned as close to the vehicle body as possible. Further, the joint portion 43 is concealed in the indented portion so that the deterioration of an aesthetic appearance due to the recognition of the mounting bracket 40 can be suppressed.

Thanks to such the shape of the peripheral walls having the indented portions, a strength of the pannier case 10 can be increased compared when the entire peripherals wall have a flat surface.

On the plate portion "P" and the bottom wall "L", the surrounding portions around the mounting openings 21a, 21b where the heads of the bolt members 29 are to be positioned can be raised of recessed compared with the further outer regions (not shown in the drawing).

When the surrounding portions around the mounting openings 21a, 21b are raised, the interference between a peripheral portion and a tool can be prevented at the time of performing a fastening operation of the bolt member and hence, a mounting/removal operation of the mounting bracket 40 can be facilitated. When the surrounding portions around the mounting openings 21a, 21b are recessed, a projection amount of the bolt head in the upward direction from the peripheral portion can be reduced and hence, the interference between a stored luggage and the bolt head can be suppressed.

Figure 6:
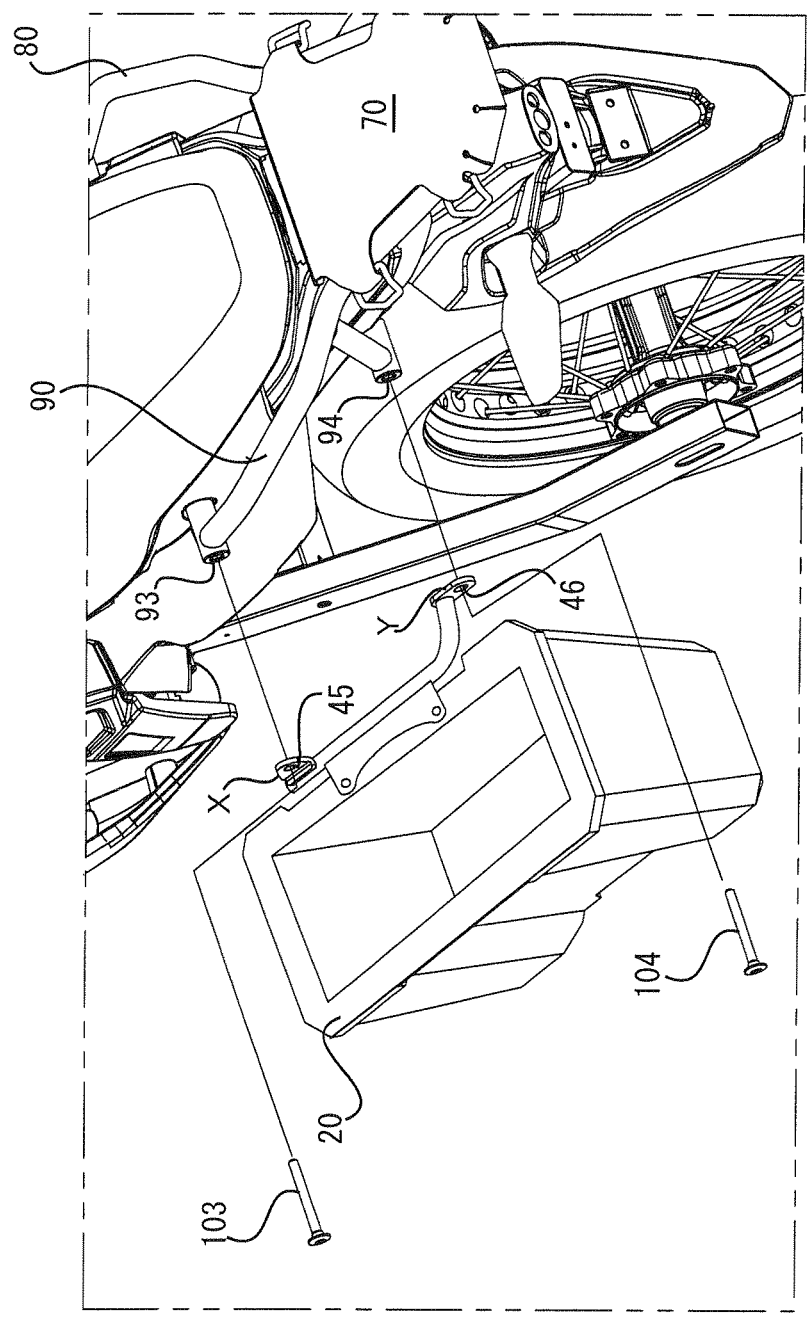
FIG. 6 is a view for describing an embodiment where the pannier case is mounted on a vehicle body via the mounting bracket.

As in the case shown in FIG. 6, when the pannier case 10 is mounted on the left side of the vehicle body, the "upper mounting portions (mounting openings 21a)" formed in the right side wall in FIG. 4A and the "lower mounting portions (mounting openings 21b)" formed in the bottom wall "L" on the right side are used for connecting the luggage basket body 20 to the vehicle body. In that case, the upper and the lower "mounting portions" formed on the other side (the left side in FIG. 4A) are not used for mounting the pannier case 10 to the vehicle body.

When the pannier case 10 is mounted on the right side of the vehicle body (on the opposite side to the above-mentioned) as in the case shown in FIG. 4, the "upper mounting portions" formed in the left side wall and the "lower mounting portion" formed in the bottom wall L on the left side are used for connecting the luggage basket body 20 to the vehicle body. In that case, the upper and the lower "mounting portions" formed on the right side in FIG. 4A are not used for mounting the pannier case 10 to the vehicle body.

As described above, the "mounting portions" are formed on left and right sides individually and hence, the pannier case 10 can be mounted on both left and right sides of the vehicle body without changing the direction of the pannier cases 10. In other words, when the pannier case which has been mounted on either the left side or the right side of the vehicle body is changed its position to the other side, it is sufficient to translationally move the pannier case in the lateral direction of the vehicle body.

Fastening members (the bolt members 29 in this embodiment) which perform a fastening operation to the upper "mounting portions" are covered by the open/close lid 30 from above in a state where the open/close lid 30 is closed, such that the exposure of the fastening members to the outside is prevented. On the other hand, fastening members (the bolt members 29 in this embodiment) which perform a fastening operation to the lower "mounting portions" are disposed in the storing space in the luggage basket body 20 in a state where the open/close lid 30 is closed.

As described above, it is preferable that the exposure of the fastening members (bolt members 29) to the outside be prevented even when the mounting portions (mounting openings 21a, 21b) per se are partially exposed to the outside in a state where the open/close lid 30 is closed. By this, an action (theft or the like) of removing the fastening member (bolt member 29) can be prevented.

On the frame extending portion, a fixing portion for connecting the pannier case 10 to the vehicle body is formed. The fixing portion is formed on both left and right sides of the vehicle body respectively. Each fixing portion on the left and the right sides comprises a plurality of fixing sites, which are spaced apart from each other in the longitudinal direction of the vehicle body. In this embodiment, as shown in FIG. 1, fixing nuts 11 are attached to the frame extending portion, and the mounting bracket 40 and the tandem grip 90 are together attached by one common bolt members, which engages with threaded holes 11a formed in the fixing nuts 11.

As can be understood from FIG. 1, the fixing nuts 11 for connecting the pannier case 10 and the vehicle body (the frame extending portion) with each other are disposed at positions which overlap with the pannier case 10 when viewed from aside. That is, bolt members 103, 104 (see FIG. 6) engaged with the fixing nuts 11 are also disposed in opposite to the pannier case 10. As a result, it becomes difficult to bring a tool close to that bolt members from aside and hence, anti-theft property can be enhanced.

The fixing nuts 11 are one kind of connection structure, to which can be connected (i) the pannier case 10, and (ii) external parts such as vehicle body equipment and accessories (a tandem grip, for example) other than the pannier case 10. That is, the pannier case 10 and the external parts other than the pannier case 10 can be mounted on the vehicle body using one common connection structure.

Openings of the threaded holes 11a are exposed to outside of the vehicle body through the through holes formed in the cowl. In this embodiment, an axis of each threaded hole 11a extends in the vehicle width direction to the outside of the vehicle. The cowl is provided in a region except where opposite to the threaded holes.

The mounting bracket 40 and the pannier case 10 are fixedly connected with each other and, thereafter, the mounting bracket 40 is attached on the vehicle body as shown in FIG. 6, such that the pannier case 10 is mounted on the vehicle body (the illustration of the open/close lid 30 omitted in FIG. 6).

Hidden in FIG. 6 but as shown in FIG. 1 partially enlarged manner, the fixing nuts 11 are provided on the frame extending portion which is disposed inside the cowl. Using these common bolt members 103, 104, the tandem grip 90 and the mounting bracket 40 are together fixed to the fixing nuts 11. That is, the bolt member 103 passes through the through hole 45 formed in the plate member "X" of the mounting bracket 40 and the through hole 93 formed in the tandem grip 90, and is fastened to the fixing nut 11. In the same manner, the bolt member 104 passes through the through hole 46 formed in the plate member "Y" of the mounting bracket 40 and the through hole 94 formed in the tandem grip 90, and is fastened to the fixing nut 11.

The pannier case 10 is connected to the vehicle body by way of the mounting bracket 40 having the lower support portion 41 and the upper support portion 42 integrally formed and hence, the pannier case 10 can be removed from the vehicle body (with the mounting bracket 40 attached on the pannier case 10), by merely separating the rod-like member 44 formed on the upper side of the mounting bracket 40 from the vehicle body.

The mounting bracket 40 is made of a material having higher rigidity than the luggage basket body 20. For example, the luggage basket body 20 is made of a resin material, while the mounting bracket 40 is made of a metal material. Further, the mounting bracket 40 supports the pannier case 10 from below the bottom wall of the pannier case 10 by the lower support portion 41 and hence, a maximum luggage capacity of the pannier case 10 can be increased.

As shown in FIG. 6, when the pannier case 10 is mounted on the vehicle body by way of the mounting bracket 40, the bolt members 103, 105 are made to pass through the through holes 45, 46 formed in the plate members "X", "Y" of the mounting bracket 40, and the pannier case 10 is connected to the fixing nuts 11 (see FIG. 1) formed on the vehicle body. In this case, as can be clearly understood from FIG. 2 which is a top plan view of the motorcycle, the mounting bracket 40 is disposed in a sandwiched manner between the vehicle body of the motorcycle and the pannier case 10. That is, the pannier case 10 is positioned so as to be opposite to where the mounting bracket 40 and the vehicle body are connected with each other (fixing nut 11).

With such the construction, it is possible to make narrower the space around the mounting bracket 40, and thus the mounting bracket 40 per se becomes difficult to be visually recognized from the outside. Thus, it becomes difficult to access the mounting bracket 40 and hence, a theft prevention effect can be enhanced.

Particularly, regarding the bolt member 103 which passes through the through hole formed in the plate member "X", the bolt member 103 is longer than the width of a gap between the vehicle body and the pannier case 10. Accordingly, when the pannier case 10 is mounted on the vehicle body, the bolt member 103 cannot be physically removed from the fixing nut, also by which a theft prevention effect is enhanced. Regarding the plate member "Y", the same theft prevention effect would be brought, if the shape of the mounting bracket 40 and the length of the bolt member 104 are suitably modified.

Considered is a case where a member having a function other than fixing the pannier case (the tandem grip which a passenger grips, for example) is used. In such the case, by making "a structure formed on the vehicle body for mounting the tandem grip on the vehicle body" and "a structure for mounting the pannier case 10 on the vehicle body" be commonly used, it becomes possible to reduce the number of the parts (a manufacturing cost can be reduced), or to enhance an aesthetic appearance of a two-wheeled vehicle when the pannier cases 10 of optional equipment are not mounted on the vehicle body. Specific description is given below.

As described previously, in FIG. 4A to FIG. 6, the mounting bracket 40 is connected to the pannier case 10, and the pannier case 10 is mounted on the vehicle body by way of this mounting bracket 40. FIG. 6 is a partial enlarged perspective view for describing the structure for mounting the left pannier case 10 on the vehicle body by way of the mounting bracket 40. For the sake of better showing, the open/close lid 30 is omitted in FIG. 6. In this embodiment, the tandem grip comprises a right grip portion 80 and a left grip portion 90 which are disposed on both sides of the vehicle body.

The left grip portion 90 is formed of a plurality of pipe-shaped members, and has two through holes 93, 94. The left grip portion 90 is mounted on the vehicle body by the bolt members 103, 104, which are made to pass through the through holes 93, 94 respectively. As described previously, the through holes 45, 46 are formed in the plate members "X", "Y" of the mounting bracket 40 respectively.

One common bolt member 103 is made to pass through the through hole 45 and the through hole 93. In the same manner, one common bolt member 104 is made to pass through the through hole 45 and the through hole 94. One common bolt member (or other connecting member) which is made to pass through the through hole formed on the tandem grip and the through hole formed on the mounting bracket as described above is referred to as "co-fastening member".

In this embodiment, two "co-fastening members" are used for the left grip portion 90. The number of "co-fastening members" is not particularly limited in the present invention. (It is also true for the right grip portion 80).

By employing such the "co-fastening member", the following advantageous effect can be acquired. That is, it becomes unnecessary to provide a mounting structure on the vehicle body, which is exclusively used for mounting of the pannier case 10 on the vehicle body.

The pannier case 10 is an optional equipment, and thus there may be a case where the pannier case 10 is removed from the vehicle body. In such the case, if there is provided a mounting structure, which is exclusively used for mounting of the pannier case, threaded holes and the like not in use would be exposed to the outside, and thus aesthetic appearance of the vehicle body is impaired. On the other hand, with the "co-fastening member" in this embodiment employed, after the pannier case 10 is removed from the vehicle body, the tandem grip is to be mounted on the vehicle body by the "co-fastening member". Thus, it is possible to prevent the exposure of the threaded holes and the like which are not in use to the outside. That is, there is no possibility that an aesthetic appearance of the vehicle body is impaired.

Even if the tandem grip is also removed from the vehicle body, the number of openings formed in the cowl can be reduced, compared to the case where the above-mentioned co-fastening structure is not adopted, and thus an aesthetic appearance can be enhanced accordingly.

Further, the pannier case 10 is fixed by the bolt members which are naturally used for fixing the tandem grip. Accordingly, even when a pannier case is additionally purchased later, a user does not need to purchase additional bolt members separately and hence, the user can suppress an expense or can reduce a cost.

FIG. 2 shows a state where the pannier case 10 is mounted on both left and right sides of the vehicle body as viewed from top. As shown in FIG. 2, the tandem grip comprises the right grip portion 80 and the left grip portion 90 disposed on both sides of the vehicle body respectively. The right grip portion 80 and the left grip portion 90 are disposed so as to be more approaching to each other, as the grip portions 80, 90 extend rearward of the vehicle body. The grip portions 80, 90 are connected to the plate member 70 disposed on the rear portion of the vehicle body.

In the case where the right grip portion 80 and the left grip portion 90 of the tandem grip are disposed so as to be more approaching to each other as the grip portions 80, 90 extend rearward of the vehicle body, as shown in FIG. 2, it is preferable that the respective pannier cases 10 mounted on both sides of the vehicle body be also inclined along both grip portions 80, 90 so as to be approaching to each other as the pannier cases 10 extend rearward of the vehicle body. In FIG. 2, regarding both the pannier cases 10 on both sides of the vehicle body, their imaginary longitudinal center planes "A" (see FIG. 4A) are shown, and it can be understood that both imaginary longitudinal center planes "A" are approaching to each other, as they extend rearward of the vehicle body.

With such the configuration, the silhouette of the vehicle body including the pannier case 10 on both sides of the vehicle body can be maintained in slim rear ward and hence, an external appearance of the vehicle body can be enhanced. Further, the pannier cases 10 are mounted on the vehicle body while maintaining substantially the same distance, over the length of the pannier cases 10, between the side wall S1 of the pannier case 10 (see FIG. 3b) and the grip portion 80, and between the side wall S1 of the pannier case 10 (see FIG. 3b) and the grip portion 90. Thus, a passenger can easily grip the tandem grip.

The description is made with respect to a configuration where the pannier cases 10 are mounted on the vehicle body in an inclined manner as shown in FIG. 1. Each pannier case 10 includes: the luggage basket body 20; the open/close lid 30 which is rotatably connected to the luggage basket body at the rotary connecting portion 31; and the locking portion 32 which locks the open/close lid 30.

In the embodiment shown in FIG. 1, the pannier case 10 is mounted on the vehicle body in an inclined posture where front side of the pannier case 10 is lower and rear side of the pannier case 10 is higher. The rotary connecting portion 31 is positioned on the lower front side of the pannier case 10, while the locking portion 32 is positioned on the higher rear side of the pannier case 10. With such the configuration, the following advantageous effects can be acquired.

That is, since the rotary connecting portion 31 is disposed at the lower position, it is possible to prevent the open/close lid 30 from being inadvertently slammed down by the gravity (compared to a case where the rotary connecting portion 31 is disposed at a higher position), whereby safety can be increased. Further, the locking portion 32 is disposed at the higher position and hence, a user can easily access the locking portion 32, whereby operability is enhanced.

Such advantageous effects can be also realized, even when the pannier case 10 is inclined in the opposite direction to what shown in FIG. 1, by the same manner where the rotary connecting portion 31 is disposed at lower position and the locking portion 32 is disposed at higher position.

Further, as indicated by an uneven broken line in FIG. 1, it is preferable (not necessary) that the open/close lid 30 be inclined in the direction away from the luggage basket body 20 with respect to the vertical line, when the open/close lid 30 is in an open state mounted on the vehicle. With such the configuration, it is possible to prevent the open/close lid 30 from being closed due to its own weight under the gravity. Thus, an open state of the open/close lid 30 can be easily maintained.

Other Embodiments

In the above-mentioned embodiment, the mounting openings 21a, 21b are formed in the pannier case 10 as the "mounting portions". But, in another embodiment of the present invention, the "mounting portion" is not limited to an opening which allows a bolt member to pass therethrough, and any desired structure can be employed as the "mounting portion", provided that the structural allows the pannier case 10 to be mounted on a vehicle body by making use of any form of engagement. For example, the "mounting portion" may be a structure what is to be formed on the pannier case side when a snap fit is employed, or the "mounting portion" may be a male thread integrally formed in the pannier case. Further, the pannier case 10 can be connected to any portion on the vehicle body, other than the fixing nuts 11 formed on the frame extending portion.

In the above-mentioned embodiment, the pannier case 10 is mounted on the vehicle body by way of the mounting bracket 40. But, in another embodiment of the present invention, it may be possible that the "mounting portion" is directly mounted on the vehicle body by bolt members or by another engaging structure, and by which the pannier case 10 is mounted on the vehicle body.

However, with the mounting bracket 40 interposed between the pannier case 10 and the vehicle body, the following advantageous effect can be acquired. That is, for some kinds of vehicle bodies, respective one mounting bracket, which is to be exclusively used for that vehicle body, is provided. Then, one pannier case 10 can be versatility used for all the kinds of the vehicle bodies.

In the above-mentioned embodiment, the pannier case 10 has an asymmetrical outer shape with respect to the imaginary lateral center plane "B" for preventing erroneous assembling. But, in another embodiment of the present invention, for example, regarding the adjacent two mounting openings 21a (see FIG. 3B) formed to the plate portion "P" of the pannier case 10, the diameters of them are made different. Also with such the configuration, (for example, by indicating that one mounting opening 21a of larger diameter is to be disposed on front side of the vehicle body, and the other mounting opening 21a of smaller diameter is to be disposed on rear side of the vehicle body), in both situation when one pannier case 10 is mounted on either the left side or the right side of the vehicle body, the pannier case 10 can be surely assembled in a predetermined direction (posture) in the longitudinal direction of a two-wheeled vehicle. Thus, it is possible to acquire an advantageous effect of preventing erroneous assembling.

Further, it is also possible to acquire the same advantageous effect of preventing erroneous assembling by the following configuration. That is, adjacent two mounting openings 21a are made to have different shapes, or otherwise, at least one of diameter and thread pitch of the bolt members 29 which are made to pass through the openings is made different.

In the above-mentioned embodiment, the tandem grips 80, 90 detachably mounted on the two-wheeled vehicle are used, and one "co-fastening member" is made to pass the through hole formed in the mounting bracket 40 mounted on the pannier case 10 and the through hole formed in the tandem grip 80, 90. But, even when an accessory other than the tandem grip (for example, a carrier for an accessory, a backrest for a passenger, a stay for fixing a top case or the like) is used, substantially the same co-fastening structure can be realized.

The pannier case is an optional equipment, and there may be a case where the two-wheeled vehicle is used with the pannier case being removed from the vehicle body. In such the case, it is possible to prevent threaded holes or the like which are not in use from being unnaturally exposed to the outside. Thus, it is possible to always keep better the aesthetic appearance of the vehicle body.

In other embodiment of the present invention, the open/close lid 30 is not necessarily one, which is rotatably connected to the luggage basket body 20 (for example, detachably, slidably or the like). Regarding the locking portion 32, it could be one which locks the open/close lid 30 in any manner including dial lock or the like, for example. The word "locking portion" also includes any means which performs any latching operation, rather than locking, by which the open/close lid 30 can be at least temporally engaged so as not to open. For example, such the "locking portion" may be an operating portion like a button.

Regarding the storing space in the pannier case 10, the wall surfaces of the storing space are not needed to be symmetrical, and the wall surfaces can be freely designed as desired. Regarding the rotary connecting portion 31, any member can be suitably selected, provided that the member can connect the luggage basket body 20 and the open/close lid 30 in a relatively rotatable manner. The structure for mounting a luggage basket of the present invention is also applicable likewise to any saddle-ride-type vehicles other than a two-wheeled vehicle, such as a four-wheel buggy, a jet ski, a snowmobile, or the like.

Additional Embodiment

Figure 7:
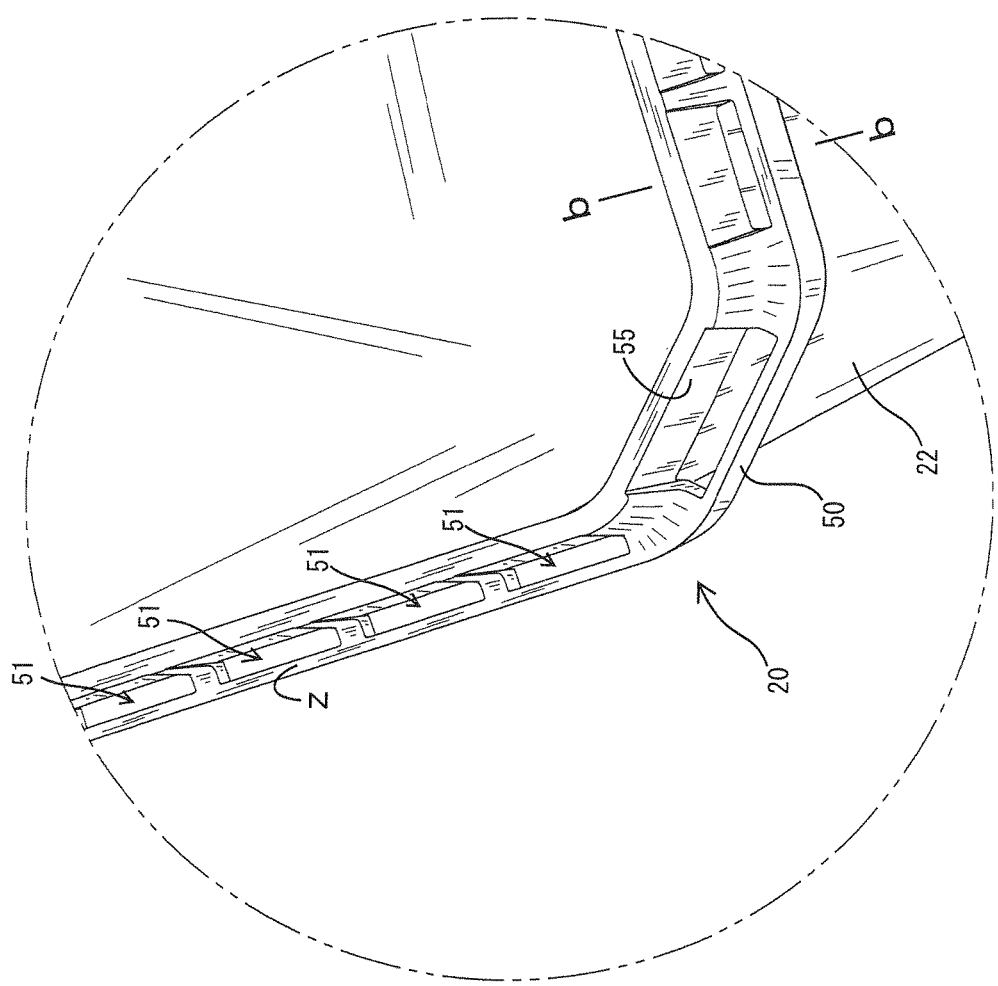
FIG. 7 is a view for describing an embodiment for increasing waterproof performance of the pannier case.
Figure 8A:
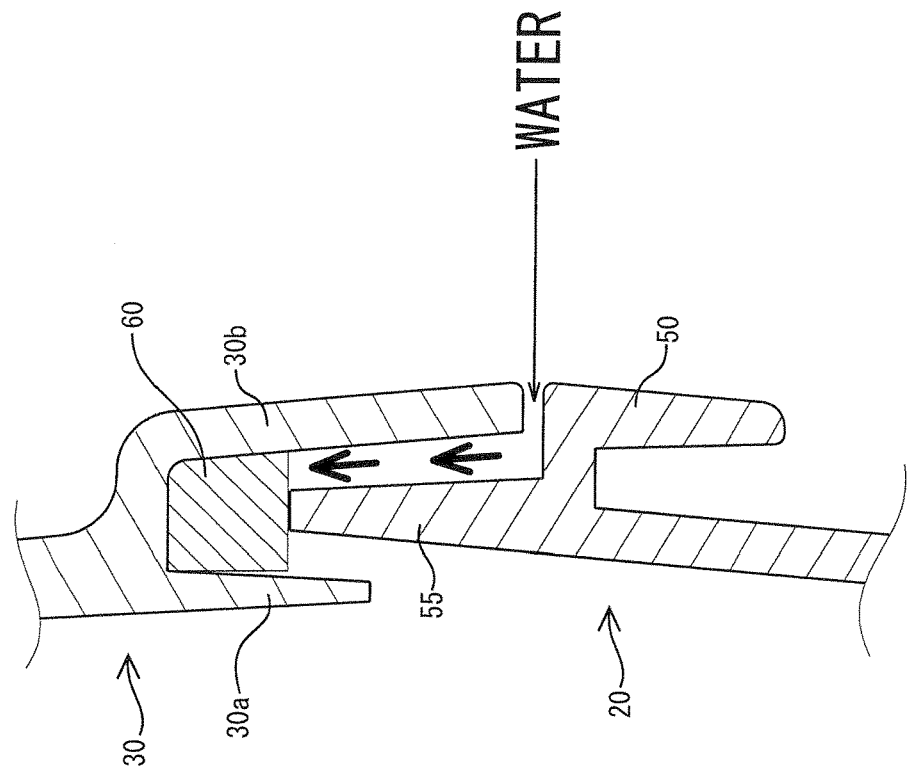
FIG. 8A and FIG. 8B are views for describing an embodiment for increasing waterproof performance of a pannier case.
Figure 8B:
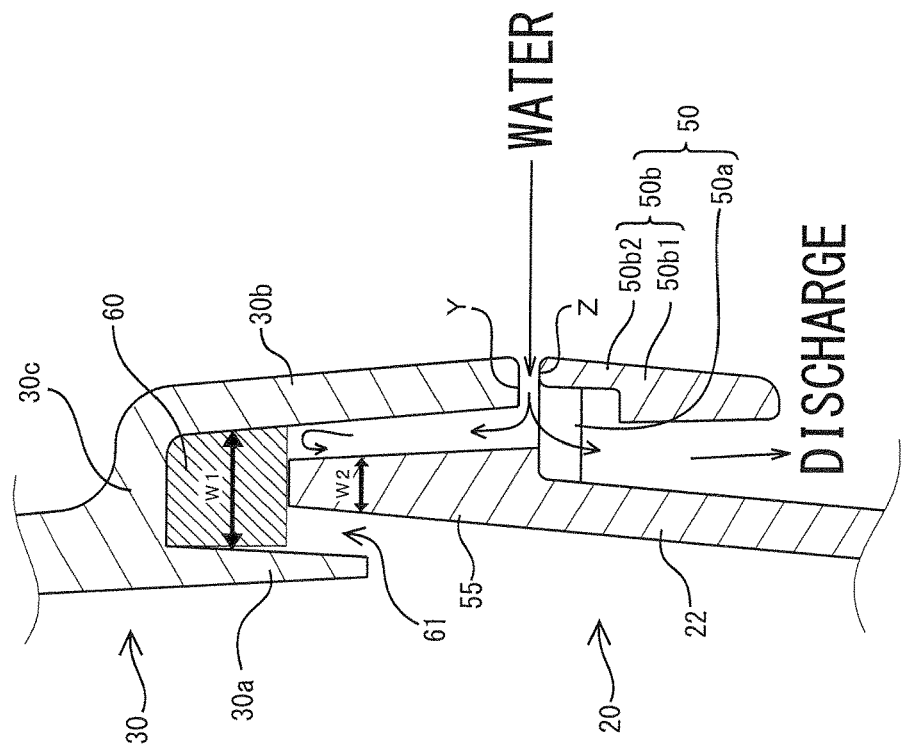

Next, with reference to FIG. 7, FIG. 8A and FIG. 8B, a structure for increasing waterproof performance of the pannier case (luggage basket) 10 is described. FIG. 7 shows a corner region of the luggage basket body 20 shown in FIG. 4B, in an enlarged manner.

The luggage basket body 20 includes; a luggage basket base portion 22 formed into a bottomed box shape; and a flange portion 50 formed on a periphery of an upper opening of the luggage basket base portion 22. The flange portion 50 is continuously connected to the upper opening of the luggage basket base portion 22, and projects outward in the radial direction from the opening. In other words, the flange portion 50 projects outward from an outer peripheral surface of the luggage basket base portion 22 in the direction toward the outside from the center of the opening. In this embodiment, the flange portion 50 is formed over the whole periphery of the upper opening of the luggage basket base portion 22, and extends in a frame-like shape along the opening. The luggage basket base portion 22 is formed into a rectangular box shape, and the flange portion 50 extends along respective sides of the luggage basket base portion 22.

FIG. 8A schematically shows a cross section taken along a line b-b in FIG. 7 in a state where the open/close lid 30 is closed. As shown in FIG. 8A, the flange portion 50 is formed into an L shape, in the cross section taken along a direction perpendicular to the peripheral wall of the luggage basket. To be more specific, the flange portion 50 includes: a projecting portion 50a which projects outward in the radial direction from the luggage basket base portion 22; and a folded back portion 50b which is continuously formed with an outer edge of the projecting portion 50a and extends downward. The flange portion 50 is formed on the luggage basket base portion 22 over the whole periphery of the luggage basket base portion 22 as described above and hence, the rigidity of the luggage basket at the upper opening can be increased.

The luggage basket body 20 includes a raised portion 55 which projects upward from an upper portion of the luggage basket base portion 22. The raised portion 55 projects upward from near the root of the projecting portion 50a of the flange portion 50. Like the flange portion 50, the raised portion 55 is formed over the whole periphery of the upper opening of the luggage basket base portion 22. With such the configuration, rigidity of the luggage basket can be further increased. In this embodiment, the thickness of the raised portion 55 is set larger than the thickness of the wall of the luggage basket base portion 22.

The projecting portion 50a is provided with water drain holes 51 which are penetrating the projecting portion 50a in the vertical direction. The water drain holes 51 are formed in the projecting portion 50a of the flange portion 50 at the location outside the luggage basket base portion 22 and the raised portion 55 and inside the folded back portion 50b. A plurality of the water drain holes 51 are formed in the projecting portion 50a along the respective sides of the luggage basket base portion 22 at intervals in the circumferential direction of the luggage basket. In this embodiment, each water drain hole 51 is formed in elongated shape extending in the circumferential direction of the luggage basket. The region of the projecting portion 50a between adjacent two water drain holes 51 function as connecting portion, which connects the folded back portion 50b to the luggage basket base portion 22.

As shown in FIG. 8A, a groove 61 which opens downward is formed on peripheral edge of the open/close lid 30, and a waterproof member 60 described later is disposed in the groove 61. The groove 61 is provided over the whole peripheral edge of the open/close lid 30. The peripheral edge of the open/close lid 30 includes: an inner side portion 30a positioned inside the raised portion 55 when the open/close lid 30 is closed; an outer side portion 30b positioned outside the raised portion 55 when the open/close lid 30 is closed; and a connecting portion 30c which connects upper portions of the inner side portion 30a and the outer side portion 30b with each other. The connecting portion 30c is disposed above the raised portion 55, facing the raised portion 55.

The width size W1 of a space (groove 61) defined between the inner side portion 30a and the outer side portion 30b of the peripheral edge of the open/close lid 30 is set larger than the thickness size W2 of the raised portion 55. With such the configuration, during opening or closing the open/close lid 30, interference between the peripheral edge of the open/close lid 30 and the raised portion 55 or deformation of these members can be prevented, and hence the open/close lid 30 can be smoothly opened and closed. The groove 61 on the peripheral edge of the open/close lid 30 is thus formed having an approximately U shaped cross section and hence, rigidity of the open/close lid 30 can be increased. In this embodiment, the waterproof member 60, which closes a gap between the connecting portion 30c and the raised portion 55 when the open/close lid 30 is closed, is disposed in the groove 61.

The waterproof member 60 is made of a material having higher resiliency than the luggage basket body 20 and the open/close lid 30. In a state where the open/close lid 30 is closed, the connecting portion 30c presses the waterproof member 60 against the raised portion 55, such that the waterproof member 60 is deformed and hence, the entrance of water into an area inside the raised portion 55 from an area outside the raised portion 55 can be prevented. In a natural state where an external force is not applied to the waterproof member 60, it is preferable that the waterproof member 60 has a width size larger than a cross-sectional shape of the groove 61 (the width size W1 between the inner side portion 30a and the outer side portion 30b) provided on the peripheral edge of the open/close lid 30. The waterproof member 60 is placed in the groove 61 with being compressed and deformed and hence, a gap between the waterproof member 60 and the inner side portion 30a or between the waterproof member 60 and the outer side portion 30b can be reduced due to a restoring force of the waterproof member 60.

In a state where the open/close lid 30 is closed, a lower end surface "Y" of the outer side portion 30b oppositely faces an upper surface "Z" of the folded back portion 50b of the flange portion. In this embodiment, the lower end surface "Y" of the outer side portion 30b is positioned above the upper surface "Z" of the folded back portion of the flange portion, and a gap is formed in the vertical direction between the lower end surface "Y" and the upper surface "Z". It is preferable that an outer surface of the outer side portion 30b and an outer surface of the folded back portion 50b of the flange portion extend substantially coplanar with each other.

Alternatively, the outer surface of the outer side portion 30*b* may be positioned more outside than the outer surface of the folded back portion 50*b*.

The folded back portion 50*b* of the flange portion is formed, such that its lower portion 50*b*1 has a larger wall thickness than its upper portion 50*b*2. In other words, the folded back portion 50*b* is so shaped that the portion adjacent to the projecting portion 50*a* is cut out compared to the remaining portion. With such the configuration, each water drain hole 51 formed in the flange portion 50 can be made larger.

As shown in FIG. 8A, there may be a case where high-pressure washing water vigorously sprayed from a nozzle enters the inside from between the lower end surface "Y" of the outer side portion 30*b* and the upper surface "Z" of the folded back portion 50*b*. Even when washing water enters the inside, the washing water flows out through the water drain holes 51 and hence, it is possible to suppress the increase of pressure in a space between the inner side portion 30*a* and the outer side portion 30*b*.

FIG. 8B is a cross-sectional view of a comparison example where the water drain holes 51 are not formed. This comparison example is provided for describing an advantageous effect obtained by forming the water drain holes 51. In the structure shown in FIG. 8B, there is no space where the high-pressure washing water can escape and hence, there may be a case where a pressure in the space between the inner side portion 30*a* and the outer side portion 30*b* becomes close to the nozzle pressure of the high-pressure washing. In such case, another structure may be required for increasing waterproof performance, by for example increasing a contact pressure of the open/close lid 30 against the luggage basket body 20.

Other Advantageous Effects of the Shown Embodiments

In the shown embodiments, a luggage basket is to be mounted on both of the left and the right sides of the vehicle body. Accordingly, it is preferable that the luggage basket is provided with the water drain holes 51 on both the left and the right sides. With such the configuration, a waterproof effect can be enhanced while increasing rigidity of the luggage basket. Further, the outer surface of the open/close lid 30 and the outer surface of the luggage basket body 20 are formed coplanar with each other and hence, even when water for high-pressure washing is sprayed to the luggage basket from an oblique direction, washing water hardly enters the gap.

The inner space (groove 61) defined between the inner side portion 30*a* and the outer side portion 30*b* extends in the circumferential direction of the luggage basket. Accordingly, the high-pressure washing water also flows in the circumferential direction of the luggage basket and hence, the increase of the pressure can be further suppressed. Further, even in the case where the high-pressure washing water enters the gap, the high-pressure washing water is discharged through a plurality of the water drain holes 32 formed at intervals in the circumferential direction of the luggage basket and hence, the increase of the pressure can be further suppressed. The water drain hole 51 is formed into an elongated shape and hence, drainage performance can be enhanced.

The position where the gap is formed between the upper surface "Z" of the folded back portion of the flange portion and the lower end surface "Y" of the outer side portion of the open/close lid and the position where the raised portion 55 and the connecting portion 30*c* opposedly face each other are disposed away from each other in vertical direction. Accordingly, the increase of pressure at the position where the raised portion 55 and the connecting portion 30*c* opposedly face each other can be further prevented. Further, the position where the raised portion 55 and the connecting portion 30*c* opposedly face each other is disposed higher than the position of the gap formed between the upper surface "Z" of the folded back portion and the lower end surface "Y" of the outer side portion. Accordingly, thanks to the gravity force, it is possible to further prevent the increase of the pressure at the position where the raised portion 55 and the connecting portion 30*c* opposedly face each other.

In this embodiment, as can be understood from FIG. 7 and FIG. 8A, on the premise that the luggage basket includes the flange portion 50 which projects in the lateral direction from the side walls of the luggage basket body, the water drain holes 51 are formed in such the flange portion 50 of the luggage basket. The open/close lid 30 is so formed that the outer side portion 30*b* of the open/close lid 30 opposedly faces the outermost edge side of the flange portion 50 when the open/close lid 30 is closed, and the water drain holes 51 are positioned inside from the outermost edge side of the flange portion 50. With such the configuration, there is obtained an external appearance of the luggage basket having a belt-like structure projecting the sideward direction (see FIG. 3A). The better design of appearance is obtained. That is, according to this embodiment, the luggage basket having high waterproof performance and excellent design property is provided.

Other Embodiments

In the case where the luggage basket is not expected to be high-pressure washed, the water drain holes 51 could be omitted. As long as the mounting portions for mounting the luggage basket on the vehicle body are provided on both sides of the luggage basket, such the luggage basket stands within the scope of the present invention, even if the luggage basket is not provided with the water drain holes 51.

On the other hand, in the case where the luggage basket is expected to be high-pressure washed, as long as the water drain holes 51 is provided on the luggage baskets, such the luggage basket stands within the scope of the present invention, even if the luggage basket is not provided with the mounting portions for mounting the luggage basket on its both sides.

In the embodiment shown in FIG. 4A and FIG. 4B, the water drain holes 51 are formed in the luggage basket body 20, except the regions on the luggage basket body 20 in the vicinity of center of the left and the right side walls. Thus, places where the water drain holes 51 are to be formed and the number of water drain holes 51 may be set as desired. High waterproof performance can be acquired by forming the water drain holes 51 over the whole periphery of the luggage basket body 20. A size and intervals of the respective water drain holes 51 can be suitably set.

What is claimed is:
1. A mounting structure comprising:
a luggage basket to be mounted on either side of a vehicle body;
wherein the luggage basket has a mounting portion for detachably mounting the luggage basket to the vehicle body, wherein the mounting portion is provided on both left and right sides of the luggage basket respectively in a state where the luggage basket is mounted on the vehicle body, wherein the mounting portion of the luggage basket is to be mounted on the vehicle body by a mounting bracket for mounting the luggage basket on the vehicle body, wherein the luggage basket has a luggage basket body having peripheral walls formed such that a distance between the peripheral walls in a lateral direction at center portions of the peripheral walls in a state in which the luggage basket is mounted on the vehicle body is smaller than a distance between the peripheral walls at both end portions of the luggage basket body, and such that the center portions of the peripheral walls are indented in the lateral direction toward an inside of the luggage basket to form indented portions, the indented portions forming spaces where a portion of the mounting bracket is disposed, and wherein the mounting portion is provided on a plate portion disposed in the indented portion, and another mounting portion for detachably mounting the luggage basket on the vehicle body is provided on a bottom wall of the luggage basket body, the plate portion extending substantially parallel to, and in a higher position in the vertical direction than the bottom wall.

2. The mounting structure according to claim 1, wherein the luggage basket further includes an open/close lid rotatably connected to the luggage basket body, and a rotary axis of the open/close lid is positioned on a front end surface of the luggage basket body, and extends in a lateral direction of the vehicle body in a state where the luggage basket is mounted on the vehicle body.

3. The mounting structure according to claim 1, wherein the luggage basket further includes an open/close lid which opens or closes the luggage basket body; and a locking portion which latches the open/close lid in a closed state, and a latch operating portion which is operated for locking the locking portion is positioned on a rear end surface of the luggage basket body in a state where the luggage basket is mounted on the vehicle body.

4. The mounting structure according to claim 1, wherein the luggage basket further includes an open/close lid which opens or closes the luggage basket body, and an operating portion which is operated in cooperation with the mounting portion for removing the luggage basket is covered by the open/close lid and the luggage basket body in a state where the open/close lid is closed.

5. The mounting structure according to claim 1, wherein:
the luggage basket further includes an open/close lid rotatably connected to the luggage basket body at a rotary connecting portion; and a locking portion which latches the open/close lid in a closed state, the luggage basket is in an inclined posture where a first end portion of the luggage basket in a longitudinal direction is disposed lower than a second end portion of the luggage basket in the longitudinal direction, and the rotary connecting portion is disposed on the lower first end portion of the luggage basket and the locking portion is disposed on the second end portion of the luggage basket.

6. A luggage basket to be mounted on a vehicle body, comprising:

a luggage basket body having an opening; and an open/close lid for opening or closing the opening of the luggage basket body, wherein a flange portion is provided on a periphery of the opening of the luggage basket body, the flange portion having a projecting portion which projects outward in radial direction from the luggage basket body, wherein the luggage basket body further has a raised portion projecting upward from near a root of the projecting portion of the flange portion, wherein a lower end surface of the open/close lid is positioned above an upper surface of the projecting portion of the flange portion at an outer side of the raised portion, and a gap is formed in a vertical direction between the lower end surface of the open/close lid and the upper surface of the projecting portion when the open/close lid is closed, and wherein a water drain hole is formed in the projecting portion of the flange portion at a position inside a region where the gap is formed between the lower end surface of the open/close lid and the upper surface of the projecting portion.

7. The mounting structure according to claim 2, wherein the luggage basket is to be mounted on the vehicle body in an inclined posture in which the front end surface of the luggage basket is lower than a rear end surface of the luggage basket, and the rotary axis of the open/close lid is disposed on the lower front end surface of the luggage basket.

8. The mounting structure according to claim 3, wherein the luggage basket is mounted on the vehicle body in an inclined posture where a front end surface of the luggage basket is lower a rear end surface of the luggage basket, and the latch operating portion is disposed on the higher rear end surface of the luggage basket.

9. The mounting structure according to claim 8, wherein the open/close lid is rotatably connected to the luggage basket body, and a rotary axis of the open/close lid is disposed on the lower front end surface of the luggage basket, and extends in the lateral direction of the vehicle body in a state where the luggage basket is mounted on the vehicle body.

10. The mounting structure according to claim 1, wherein, the plate portion extends over an entire width of the indented portion in the longitudinal direction in a state in which the luggage basket is mounted on the vehicle body, and the mounting portion is formed in the plate portion.

11. A luggage basket to be mounted on a side of a vehicle body, comprising:

a mounting portion for detachably mounting the luggage basket on the vehicle body, wherein the luggage basket comprises a luggage basket body having an opening, and an open/close lid for opening or closing the opening of the luggage basket body, wherein the mounting portion of the luggage basket is mounted on the vehicle body by a mounting bracket for mounting the luggage basket on the vehicle body, wherein an indented portion indented toward an inside of the luggage basket is formed on a peripheral wall of the luggage basket body, the indented portion functioning as a space where a portion of the mounting bracket is disposed, and wherein the mounting portion is provided on a plate portion disposed in the indented portion, and another mounting portion for detachably mounting the luggage basket on the vehicle body is provided on a bottom wall of the luggage basket body, the plate portion extending substantially parallel to, and in a higher position in the vertical direction than the bottom wall.

12. The luggage basket according to claim 11, wherein peripheral walls of the luggage basket body are formed such that a distance between the peripheral walls in a lateral direction at center portions in a state where the luggage basket is mounted on the vehicle body is smaller than a distance between the peripheral walls at both end portions, and such that the center portions of the peripheral walls are indented toward the inside of the luggage basket to form the indented portions.

13. The luggage basket according to claim 11, wherein the indented portion is formed on both left and right sides of the luggage basket body in a state where the luggage basket is mounted on the vehicle body.

14. The luggage basket according to claim 11, wherein
an operating portion which is operated in cooperation with the mounting portion for removing the luggage basket is covered by the open/close lid and the luggage basket body in a state where the open/close lid is closed.

15. A luggage basket to be mounted on a side of a vehicle body, comprising:
a mounting portion for detachably mounting the luggage basket on the vehicle body,
wherein the luggage basket comprises a luggage basket body having an opening, and an open/close lid for opening or closing the opening of the luggage basket body,
wherein the mounting portion of the luggage basket is mounted on the vehicle body by a mounting bracket for mounting the luggage basket on the vehicle body,
wherein an indented portion indented toward an inside of the luggage basket is formed on a peripheral wall of the luggage basket body, the indented portion functioning as a space where a portion of the mounting bracket is disposed,
wherein the mounting portion is disposed in the indented portion,
wherein a flange portion is provided on a periphery of the opening of the luggage basket body, the flange portion having a projecting portion which projects outward in a radial direction from the luggage basket body,
a raised portion of the luggage basket body projects upward from near a root of the projecting portion of the flange portion,
a lower end surface of the open/close lid is positioned above an upper surface of the projecting portion of the flange portion at an outer side of the raised portion, and a gap is formed in a vertical direction between the lower end surface of the open/close lid and the upper surface of the projecting portion in a state in which the open/close lid is closed, and
a water drain hole is formed in the projecting portion of the flange portion at a position inside a region where the gap is formed between the lower end surface of the open/close lid and the upper surface of the projecting portion.

* * * * *